United States Patent Office 3,300,356
Patented Jan. 24, 1967

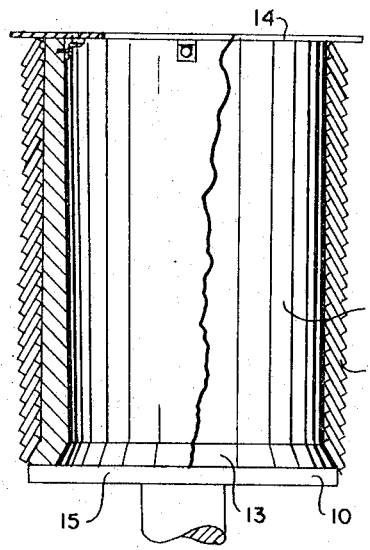
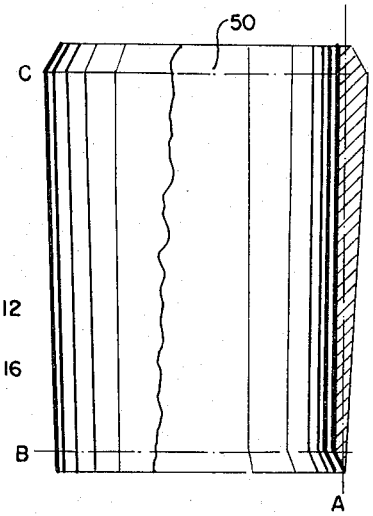
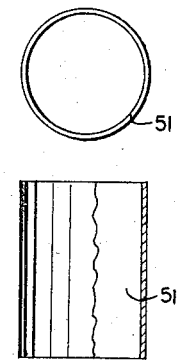
FIG. 1
FIG. 3
FIG. 4
FIG. 5
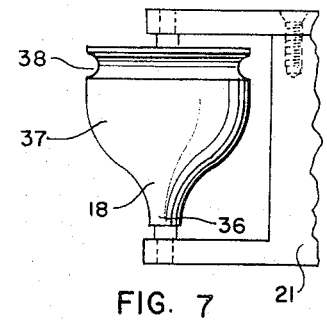
FIG. 7
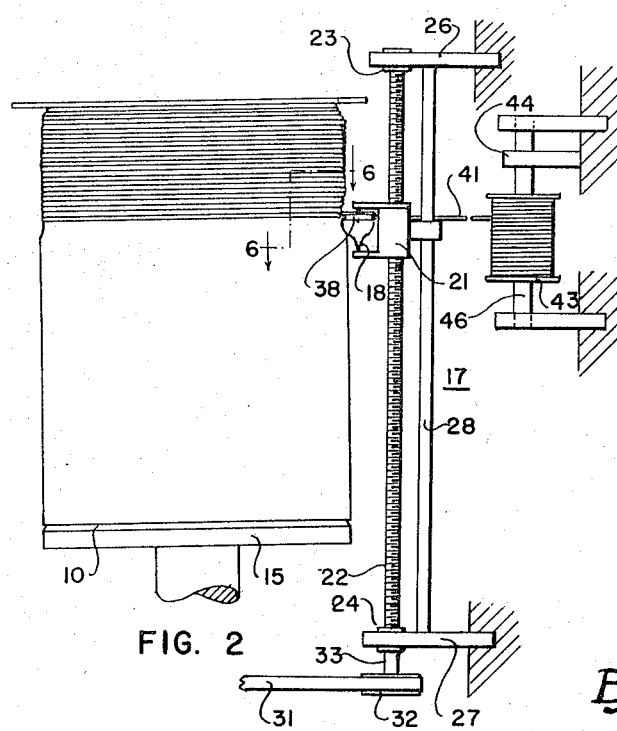
FIG. 2
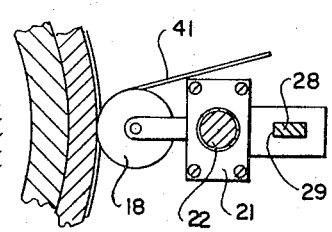
FIG. 6
INVENTOR.
ELMER P. WARNKEN
MILTON KORELITZ
Attorneys

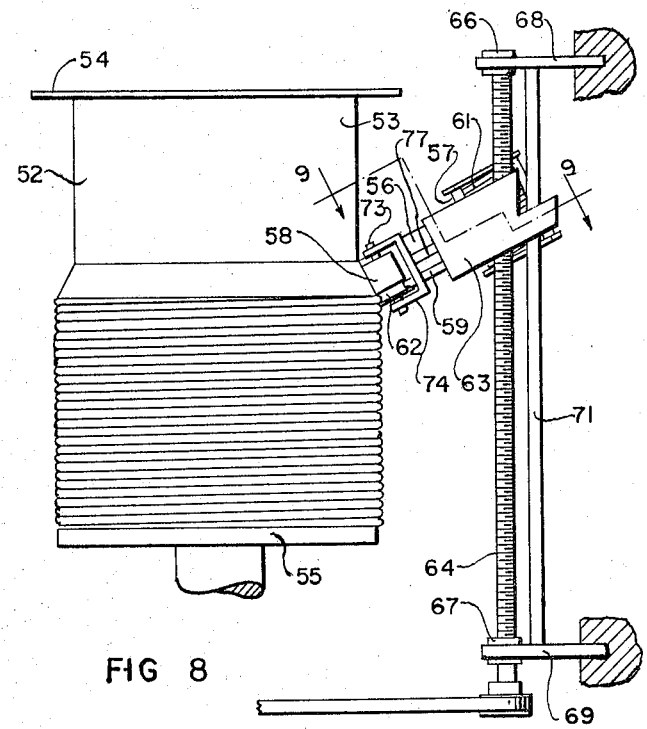
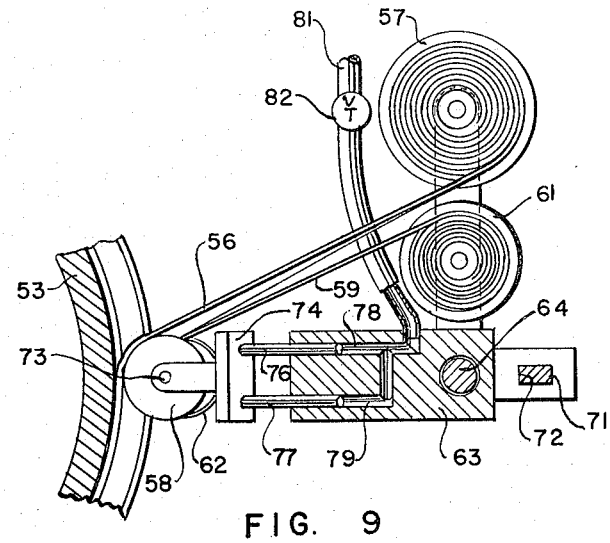
FIG. 8
FIG. 9

3,300,356
METHOD AND APPARATUS FOR FORMING LAMINATED, CYLINDRICAL WALL STRUCTURES
Elmer P. Warnken, Cincinnati, and Milton Korelitz, Golf Manor, Ohio, assignors to Studebaker Corporation, South Bend, Ind., a corporation of Michigan
Filed Aug. 16, 1965, Ser. No. 480,087
6 Claims. (Cl. 156—189)

This is a continuation-in-part of our copending application Serial No. 255,321, filed January 31, 1963, now abandoned.

This invention relates to a method and devices for forming a wall structure.

An object of this invention is to provide a method of forming a resin-impregnated laminated wall structure.

Resin-impregnated wall structures require molding or compacting before curing. Moderate sized wall structures can be molded between mating dies, but such mating dies are inconvenient to use and costly in large sizes, and a further object of this invention is to provide a method and machine for molding and compacting laminations without need of large or expensive equipment.

A further object of this invention is to provide a method and machines by which laminations are compressed or compacted in small areas progressing along a lay-up of laminations and in which, as the laminations are compressed, an outer laying or wrapping of a continuous member or band is wound around the compressed laminations to prevent release of compression until the resin of the laminations has been cured.

A further object of this invention is to provide such a method in which compression of the laminations is effected in small areas progressing along the wall and in which the continuous member follows the path of the compressing so that, as soon as the material has been compressed, the continuous member is applied thereto.

A further object of this invention is to provide such a method in which the path of compression proceeds helically along the laminations.

A further object of this invention is to provide a machine for compressing laminations and for wrapping a winding thereon as the laminations are compressed.

A further object of this invention is to provide such a method and machine in which the degree of compressing or compacting is varied along the lay-up so that there is provided a varying density along the length thereof.

A further object of this invention is to provide a method of forming such a wall of varying density from layers or laminations of resin-impregnated fabric material or the like which are laid up on a mandrel and are compressed to varying densities before being cured.

A further object of this invention is to provide a method of forming a wall having uniform or selected thickness throughout and varying density in which the wall is formed by first laying up a resin-impregnated tape on a mandrel in face-to-face overlapping layers, compressing the laminations to a predetermined degree by means of a tool progressing along the laminations, the degree being varied along the lay-up as desired, wrapping a continuous flexible compressing member about the laminations as the laminations are compressed, curing the resin while the laminations are compressed by the continuous member, and machining away unwanted sections or portions of the laminations to form the wall structure.

The above and other objects and features of the invention will be apparent to those skilled in the art to which this invention pertains from the following detailed description and the drawings, in which:

FIG. 1 is a view partly in side elevation and partly in section showing a mandrel with laminations wound thereon in accordance with the method of this invention;

FIG. 2 is a view in side elevation of the mandrel with the laminations thereon, the laminations on the mandrel being partly formed with a continuous wrapping band covering the formed portion, a device constructed in accordance with an embodiment of this invention for molding the laminations being shown in association therewith;

FIG. 3 is a view partly in side elevation and partly in section of the laminations following molding and curing thereof, lines for machining being indicated in dot-dash lines;

FIG. 4 is a plan view of the wall after machining;

FIG. 5 is a view partly in side elevation and partly in section of the laminations following machining;

FIG. 6 is an enlarged view in section taken on the line 6—6 in FIG. 2;

FIG. 7 is an enlarged fragmentary view in side elevation of the molding tool and supports therefor;

FIG. 8 is a view in side elevation of a mandrel and a device for molding laminations constructed in accordance with another embodiment of this invention; and FIG. 9 is a view in section on an enlarged scale taken on the line 9—9 in FIG. 8.

In the following detailed description and the drawing, like reference characters indicate like parts.

In FIG. 1 is shown a mandrel 10 having a cylindrical body 12 and a conic lower portion 13. A removable cap plate 14 is attached to the upper end of the mandrel as shown in FIG. 1. The mandrel is mounted on a turntable 15, which can be turned in any appropriate manner for convenience in wrapping a continuous winding of resin-impregnated fabric tape or strip 16 thereon. The tape can be of an appropriate resin-impregnated fabric material. Where the wall is expected to undergo high temperatures or pressures, the tape can be formed of glass fiber cloth or asbestos fiber cloth or other heat resistant fibrous material or the like. The fabric strip is impregnated with an appropriate thermo-setting resin such as a phenol-formaldehyde type resin, an epoxy resin, or the like.

The strip is wound tightly on the mandrel with laminations in face-to-face relation with each lamination displaced from adjacent laminations so that a minor portion of one face of each lamination is exposed at the outside of the lay-up laminations on the mandrel. Some air spaces remain between and surrounding the lamination layers, and the laminations require compression before curing in order to make a strong structure. The laminations are molded and compressed by a machine 17 illustrated in FIG. 2. The molding machine includes a molding tool 18 rotatably mounted on a traveling yoke 21. The traveling yoke 21 is mounted on a lead screw 22 and travels therealong as the lead screw is turned. The lead screw 22 is supported in bearings 23 and 24 mounted in stationary frames 26 and 27, respectively. A guide rod 28 is mounted on the frames 26 and 27 and extends through an opening 29 (FIG. 6) in the body of the traveling yoke 21 to prevent turning of the yoke as the tool 18 travels along laminations on the mandrel 10. The lead screw 22 can be driven by a belt 31 running on a pulley 32 mounted on an extension 33 of the lead screw 22.

The tool 18 has a forward end portion 36 (see FIG. 7) of small diameter and a body 37 of greater diameter linked by a central section of increasing diameter. An annular groove 38 is formed in the tool 18 adjacent the trailing edge thereof.

The laminations are molded by the tool 18. The turntable 15 (FIG. 2) and the mandrel 10 are rotated while the tool 18 is advanced slowly along the lead screw so that the face of the lay-up of laminations on the mandrel is molded by the tool 18. As the turntable 15 is rotated, a line 41 is wound on the laminations as the tool 18 compresses the laminations. The line is guided through the groove 38 onto the laminations. The line 41 can be fed off a drum 43. A brake 44 (not shown in detail) on a shaft 46 of the drum 43 causes a predetermined tension to be exerted on the line 41 as the line is wound. The drum 43 can be a sufficient distance from the tool to permit winding therefrom, or appropriate guides, not shown, can be supplied to guide the line from the drum into the groove of the tool. The rate of turning of the lead screw 22 is so timed that the rate of advance of the tool along the face of the laminations is just sufficiently fast that the convolutions of the line are wrapped in substantial engagement with a single layer of the line on the outside of the laminations. The tool travels along a helical path with respect to the face of the laminations to compress the laminations.

When it is desired that the density of the wall vary along the length thereof, the axis of the mandrel 10 and the axis of the lead screw 22 can converge, as shown in FIG. 2, so that the lower portion of the laminations can be compressed to a greater degree than the upper portion, and the laminations are compressed to the form shown in FIG. 3. The interior of the mandrel can be heated by appropriate heating apparatus (not shown) during forming with the tool 18 to cause the resin to have a sufficiently high temperature that the resin can yield sufficiently to permit forming of the laminations. If it is desired that the density of the laminations vary in some other manner than uniformly from end to end, other appropriate apparatus can be supplied for guiding the tool inwardly or outwardly as it advances along the laminations to permit forming with a selected density in selected sections or portions of the laminations.

The line can be of any appropriate type, but we prefer to use a strong flexible line or band such as a line formed of glass fiber rovings, or a metal wire or the like.

When the laminations have been compressed, the mandrel and the laminations are heated to a sufficient temperature to permit setting of the resin while the line is in place holding the laminations in position until the resin has set.

If desired, the molded laminations 50 can be machined as along the lines A, B, and C indicated in dot-dash lines in FIG. 3 to form an annular wall 51 of uniform thickness throughout the length thereof but varying in density from end to end as shown in FIGS. 4 and 5.

In FIGS. 8 and 9 is shown a machine constructed in accordance with another embodiment of this invention which includes a mandrel 52 having a body 53 and a removable cap plate 54 mounted on a turntable 55 which can be turned in an appropriate manner. A strip of resin-impregnated glass fiber cloth 56 is directed from a spool 57 around a forming tool 58 onto the mandrel, and a line 59 is directed from a spool 61 around an annular groove 62 in the tool 58 as laminations are wound on the mandrel.

As shown in FIG. 9, the spools 57 and 61 are rotatably supported on a carriage block 63. The carriage block 63 is mounted on and is driven for moving substantially parallel to the axis of the mandrel 50 by a lead screw 64. The lead screw 64 is supported in bearings 66 and 67 mounted on stationary frames 68 and 69, respectively. A guide rod 71 mounted on the frames 68 and 69 and extending through an opening 72 in the carriage 63 prevents turning of the carriage as it travels along the lead screw. The tool 58, as shown in FIGS. 8 and 9, is generally cylindrical in form. The annular groove 62, in which the line 59 is received, is provided at a trailing edge thereof. The tool is rotatably mounted on a shaft 73 which extends between arms of a yoke 74. The yoke 74, in turn, is mounted on piston rods 76 and 77 (FIG. 9) which are received in bores 78 and 79, respectively, in the carriage block 63. As shown most clearly in FIG. 8, the piston rods project at such an angle to the axis of the lead screw 64 that the axis of the tool is at a proper angle to the axis of the mandrel for laying the laminations in place thereon. Fluid under pressure is directed to the bores 78 and 79 from a pressure line 81 (FIG. 9) through an appropriate throttle and control valve 82 so that the pressure in the bores can be controlled to a predetermined pressure and can be varied as desired as the carriage progresses along the lead screw so that the degree of compression of the laminations can be controlled to give a density which varies as desired along the length of the laminations.

The method and machines have been described with relation to formation of a cylindrical wall. However, if a conic wall is desired, laminations can be formed on a conic mandrel and then molded in a similar manner, and if other forms of walls are desired, mandrels of other shapes can be used.

The machine and method illustrated in the drawing and described above are subject to modification without departing from the spirit and scope of the appended claims.

Having described our invention, what we claim as new and desire to secure by Letters Patent is:

1. A method of forming an annular wall which comprises forming a body of annularly extending resin-impregnated laminations on a mandrel, compressing selected sections of the laminations along a helical path extending circumferentially of and along the laminations, wrapping a continuous band on the laminations along the helical path as the laminations are compressed, the band having a plurality of convolutions, and curing the resin while held by said band.

2. A method of forming an annular wall which comprises forming a body of annularly extending resin-impregnated laminations on a mandrel, compressing selected sections of the laminations along a helical path extending substantially circumferentially of and along the laminations, the path approaching the mandrel more closely in selected sections than in other selected sections, whereby the laminations are compressed to a greater density in said certain selected sections, wrapping a continuous band on the laminations along the helical path as the laminations are compressed, the band having a plurality of convolutions, and curing the resin while held by said band.

3. A device for forming a laminated annular wall of varying density which comprises a mandrel for supporting annular resin-impregnated laminations forming an annular wall, a tool for compressing the laminations, said tool comprising a leading portion, and a trailing portion, there being a transverse groove in the trailing portion, and means for advancing the tool along a path in engagement with the laminations extending circumferentially of and along the laminations with the path approaching the mandrel more closely in selected sections than in other selected sections, whereby the laminations are compressed to selected densities, and means for directing a line along the groove to be wrapped on the laminations to hold the laminations in compressed condition.

4. A device for forming a laminated annular wall of varying density which comprises a mandrel for supporting annular face-to-face resin-impregnated laminations forming an annular wall, means for rotating the mandrel, a tool for compressing the laminations, said tool having a leading portion and a trailing portion, there being an annular groove in the trailing portion, means for rotatably mounting the tool for engagement with the laminations, means for guiding the tool along the mandrel as the mandrel turns with the path of the tool approaching the mandrel more closely in selected sections than in other sections, whereby the laminations are compressed to selected densities, and means for directing a band along the groove to be wrapped on the laminations to hold the laminations in compressed condition.

5. A device for forming a laminated annular wall of varying density which comprises a mandrel for supporting annular face-to-face resin-impregnated laminations forming an annular wall, means for rotating the mandrel, a tool for compressing the laminations, said tool having a leading portion and a trailing portion, there being an annular groove in the trailing portion, means for rotatably mounting the tool for engagement with the laminations, means for guiding the tool along the mandrel as the mandrel turns, means for urging the tool against the laminations with a predetermined pressure, means for varying the predetermined pressure as the tool advances along the mandrel, whereby the laminations are compressed to selected densities, and means for directing a band along the groove to be wrapped on the laminations to hold the laminations in compressed condition.

6. A device for forming a laminated annular wall of varying density which comprises a mandrel, means for rotating the mandrel, a tool for guiding a strip to the mandrel to form annular face-to-face laminations thereon and for compressing the laminations, said tool having a leading portion and a trailing portion, there being an annular groove in the trailing portion, means for rotatably mounting the tool adjacent a face of the mandrel, means for guiding the tool along the mandrel as the mandrel turns, means for feeding the strip to the tool to be laid on the mandrel, means for urging the tool against the laminations with a predetermined pressure as the tool advances along the mandrel, means for varying the predetermined pressure as the tool advances along the mandrel whereby the laminations are compressed to selected densities, and means for directing a band along the groove to be wrapped on the laminations to hold the laminations in compressed condition.

References Cited by the Examiner
UNITED STATES PATENTS

| | | | |
|---|---|---|---|
| 1,665,585 | 4/1928 | Esch | 156—194 X |
| 2,503,041 | 4/1950 | Greene | 156—184 X |
| 2,751,237 | 6/1956 | Conley. | |
| 2,814,313 | 11/1957 | Tate. | |
| 2,966,935 | 1/1961 | Wiltshire. | |
| 2,982,457 | 5/1961 | D'Alelio | 220—83 X |
| 3,140,968 | 7/1964 | Barrios et al. | 156—195 X |
| 3,141,806 | 7/1964 | Reinman | 156—195 X |

EARL M. BERGERT, *Primary Examiner.*

P. DIER, *Assistant Examiner.*